(12) United States Patent
Carr et al.

(10) Patent No.: US 6,788,800 B1
(45) Date of Patent: Sep. 7, 2004

(54) AUTHENTICATING OBJECTS USING EMBEDDED DATA

(75) Inventors: J. Scott Carr, Beaverton, OR (US); Burt W. Perry, Lake Oswego, OR (US)

(73) Assignee: DigiMarc Corporation, Tualatin, OR (US)

(*) Notice: Subject to any disclaimer, the term of this patent is extended or adjusted under 35 U.S.C. 154(b) by 191 days.

(21) Appl. No.: 09/625,577

(22) Filed: Jul. 25, 2000

(51) Int. Cl.[7] .......................... G06K 9/00; G06F 17/00
(52) U.S. Cl. ........................... 382/100; 235/375
(58) Field of Search .................. 382/100, 101, 382/102, 138, 139, 140, 232, 233, 115; 380/28, 54, 252, 201; 358/1.12; 700/214; 705/59, 67, 75, 26; 709/203, 204, 217; 235/375; 713/200

(56) References Cited

U.S. PATENT DOCUMENTS

| | | | |
|---|---|---|---|
| 3,493,674 A | 2/1970 | Houghton | 348/478 |
| 3,569,619 A | 3/1971 | Simijian | 235/380 |
| 3,576,369 A | 4/1971 | Wick et al. | 355/77 |
| 3,585,290 A | 6/1971 | Sanford | 348/478 |
| 3,655,162 A | 4/1972 | Yamamoto et al. | 249/219.2 |
| 3,703,628 A | 11/1972 | Philipson, Jr. | 235/432 |
| 3,809,806 A | 5/1974 | Walker et al. | 347/260 |
| 3,838,444 A | 9/1974 | Loughlin et al. | 348/486 |
| 3,914,877 A | 10/1975 | Hines | 380/54 |
| 3,922,074 A | 11/1975 | Ikegami et al | 380/54 |
| 3,971,917 A | 7/1976 | Maddox et al. | 235/462.39 |
| 3,977,785 A | 8/1976 | Harris | 355/133 |
| 3,982,064 A | 9/1976 | Barnaby | 348/468 |
| 3,984,624 A | 10/1976 | Waggener | 348/473 |
| 4,025,851 A | 5/1977 | Haselwood et al. | 725/22 |
| 4,184,700 A | 1/1980 | Greenaway | 283/91 |
| 4,225,967 A | 9/1980 | Miwa et al. | 465/68 |
| 4,230,990 A | 10/1980 | Lert, Jr. et al. | 725/22 |
| 4,231,113 A | 10/1980 | Blasbalg | 380/34 |
| 4,238,849 A | 12/1980 | Gassmann | 370/204 |
| 4,252,995 A | 2/1981 | Schmidt et al. | 381/14 |
| 4,262,329 A | 4/1981 | Bright et al. | 713/164 |

(List continued on next page.)

FOREIGN PATENT DOCUMENTS

| | | |
|---|---|---|
| CA | 2235002 | 12/1998 |
| DE | 3806411 | 9/1989 |

(List continued on next page.)

OTHER PUBLICATIONS

Amano et al., "A Feature Calibration Method for Watermarking of Document Images", ICDAR 1999, pp. 91–94.*

(List continued on next page.)

*Primary Examiner*—Jayanti K. Patel
(74) *Attorney, Agent, or Firm*—DigiMarc Corporation

(57) ABSTRACT

This disclosure describes a method of making a secure product using data hidden in the product itself and a method of using the hidden data to authenticate the product. The method assigns a product identifier to the product, such as a unique serial number. It also steganographically embeds security data into the product. The security data includes the product identifier (e.g., a hashed version of it). The security data is embedded such that it is machine readable and enables automated authentication of the product by comparing the security data decoded from the product with the product identifier.

29 Claims, 1 Drawing Sheet

U.S. PATENT DOCUMENTS

| | | | |
|---|---|---|---|
| 4,313,197 A | 1/1982 | Maxemchuk | 370/210 |
| 4,367,488 A | 1/1983 | Leventer et al. | 348/467 |
| 4,379,947 A | 4/1983 | Warner | 370/204 |
| 4,380,027 A | 4/1983 | Leventer et al. | 348/467 |
| 4,389,671 A | 6/1983 | Posner et al. | 380/235 |
| 4,395,600 A | 7/1983 | Lundy et al. | 381/73.1 |
| 4,416,001 A | 11/1983 | Ackerman et al. | 369/44.18 |
| 4,423,415 A | 12/1983 | Goldman | 386/95 |
| 4,425,642 A | 1/1984 | Moses et al. | 370/477 |
| 4,476,468 A | 10/1984 | Goldman | 340/5.86 |
| 4,528,588 A | 7/1985 | Löfberg | 340/5.1 |
| 4,532,508 A | 7/1985 | Ruell | 84/7 |
| 4,547,804 A | 10/1985 | Greenberg | 348/460 |
| 4,553,261 A | 11/1985 | Froessl | 382/306 |
| 4,590,366 A | 5/1986 | Rothfjell | 235/494 |
| 4,595,950 A | 6/1986 | Lofberg | 380/202 |
| 4,637,051 A | 1/1987 | Clark | 382/101 |
| 4,639,779 A | 1/1987 | Greenberg | 348/460 |
| 4,647,974 A | 3/1987 | Butler et al. | 725/36 |
| 4,654,867 A | 3/1987 | Labedz et al. | 455/438 |
| 4,660,221 A | 4/1987 | Dlugos | 705/62 |
| 4,663,518 A | 5/1987 | Borror et al. | 235/487 |
| 4,665,431 A | 5/1987 | Cooper | 348/460 |
| 4,672,605 A | 6/1987 | Hustig et al. | 370/201 |
| 4,675,746 A | 6/1987 | Tetrick et al. | 358/296 |
| 4,677,435 A | 6/1987 | D'Agraives et al. | 710/1 |
| 4,682,794 A | 7/1987 | Margolin | 380/212 |
| 4,703,476 A | 10/1987 | Howard | 370/491 |
| 4,712,103 A | 12/1987 | Gotanda | 340/5.53 |
| 4,718,106 A | 1/1988 | Weinblatt | 455/201 |
| 4,723,149 A | 2/1988 | Harada | 399/183 |
| 4,739,377 A | 4/1988 | Allen | 355/133 |
| 4,750,173 A | 6/1988 | Blüthgen | 370/528 |
| 4,765,656 A | 8/1988 | Becker et al. | 283/70 |
| 4,775,901 A | 10/1988 | Nakano | 725/24 |
| 4,776,013 A | 10/1988 | Kafri et al. | 380/54 |
| 4,805,020 A | 2/1989 | Greenberg | 348/460 |
| 4,807,031 A | 2/1989 | Broughton et al. | 348/460 |
| 4,811,357 A | 3/1989 | Betts et al. | 375/130 |
| 4,811,408 A | 3/1989 | Goldman | 382/115 |
| 4,820,912 A | 4/1989 | Samyn | 340/310.07 |
| 4,835,517 A | 5/1989 | van der Gracht et al. | 380/51 |
| 4,855,827 A | 8/1989 | Best | 348/485 |
| 4,864,618 A | 9/1989 | Wright et al. | 707/9 |
| 4,866,771 A | 9/1989 | Bain | 707/9 |
| 4,874,936 A | 10/1989 | Chandler et al. | 235/494 |
| 4,876,617 A | 10/1989 | Best et al. | 360/60 |
| 4,879,747 A | 11/1989 | Leighton et al. | 713/186 |
| 4,884,139 A | 11/1989 | Pommier | 348/21 |
| 4,885,632 A | 12/1989 | Mabey et al. | 725/20 |
| 4,888,798 A | 12/1989 | Earnest | 705/54 |
| 4,903,301 A | 2/1990 | Kondo et al. | 704/501 |
| 4,908,836 A | 3/1990 | Rushforth et al. | 375/152 |
| 4,908,873 A | 3/1990 | Philibert et al. | 382/100 |
| 4,918,484 A | 4/1990 | Ujiie et al. | 355/41 |
| 4,920,503 A | 4/1990 | Cook | 348/552 |
| 4,921,278 A | 5/1990 | Shiang et al. | 283/87 |
| 4,939,515 A | 7/1990 | Adelson | 235/456 |
| 4,941,150 A | 7/1990 | Iwasaki | 375/145 |
| 4,943,973 A | 7/1990 | Werner | 375/141 |
| 4,943,976 A | 7/1990 | Ishigaki | 375/142 |
| 4,944,036 A | 7/1990 | Hyatt | 367/43 |
| 4,947,028 A | 8/1990 | Gorog | 235/380 |
| 4,963,998 A | 10/1990 | Maufe | 360/60 |
| 4,965,827 A | 10/1990 | McDonald | 705/65 |
| 4,967,273 A | 10/1990 | Greenberg | 725/22 |
| 4,969,041 A | 11/1990 | O'Grady et al. | 348/473 |
| 4,972,471 A | 11/1990 | Gross et al. | 455/2.01 |
| 4,972,475 A | 11/1990 | Sant'Anselmo | 380/54 |
| 4,972,476 A | 11/1990 | Nathans | 713/186 |
| 4,977,594 A | 12/1990 | Shear | 705/53 |
| 4,979,210 A | 12/1990 | Nagata et al. | 360/60 |
| 4,996,530 A | 2/1991 | Hilton | 341/120 |
| 5,003,590 A | 3/1991 | Lechner et al. | 380/204 |
| 5,010,405 A | 4/1991 | Schreiber et al. | 348/432.1 |
| 5,023,907 A | 6/1991 | Johnson et al. | 710/200 |
| 5,027,401 A | 6/1991 | Soltesz | 380/54 |
| 5,034,982 A | 7/1991 | Heninger et al. | 380/54 |
| 5,036,513 A | 7/1991 | Greenblatt | 370/259 |
| 5,053,956 A | 10/1991 | Donald | 713/601 |
| 5,063,446 A | 11/1991 | Gibson | 348/484 |
| 5,073,899 A | 12/1991 | Collier et al. | 375/135 |
| 5,073,925 A | 12/1991 | Nagata et al. | 360/60 |
| 5,075,773 A | 12/1991 | Pullen et al. | 375/240.01 |
| 5,077,608 A | 12/1991 | Dubner | 348/583 |
| 5,077,795 A | 12/1991 | Rourke et al. | 380/55 |
| 5,079,648 A | 1/1992 | Maufe | 360/31 |
| 5,091,966 A | 2/1992 | Bloomberg et al. | 382/203 |
| 5,095,196 A | 3/1992 | Miyata | 235/382 |
| 5,103,459 A | 4/1992 | Gilhousen et al. | 370/206 |
| 5,113,437 A | 5/1992 | Best et al. | 380/253 |
| 5,113,445 A | 5/1992 | Wang | 380/51 |
| 5,128,525 A | 7/1992 | Stearns et al. | 235/454 |
| 5,144,660 A | 9/1992 | Rose | 713/200 |
| 5,146,457 A | 9/1992 | Veldhuis et al. | 370/523 |
| 5,148,498 A | 9/1992 | Resnikoff et al. | 382/248 |
| 5,150,409 A | 9/1992 | Elsner | 713/177 |
| 5,161,210 A | 11/1992 | Druyvesteyn et al. | 704/200 |
| 5,166,676 A | 11/1992 | Milheiser | 340/10.34 |
| 5,168,147 A | 12/1992 | Bloomberg | 235/133 R |
| 5,181,786 A | 1/1993 | Hujink | 400/61 |
| 5,185,736 A | 2/1993 | Tyrrell et al. | 370/358 |
| 5,199,081 A | 3/1993 | Saito et al. | 382/116 |
| 5,200,822 A | 4/1993 | Bronfin et al. | 725/22 |
| 5,212,551 A | 5/1993 | Conanan | 348/484 |
| 5,213,337 A | 5/1993 | Sherman | 463/40 |
| 5,228,056 A | 7/1993 | Schilling | 375/144 |
| 5,243,411 A | 9/1993 | Shirochi et al. | 348/473 |
| 5,243,423 A | 9/1993 | DeJean et al. | 348/473 |
| 5,245,165 A | 9/1993 | Zhang | 235/454 |
| 5,245,329 A | 9/1993 | Gokcebay | 340/5.33 |
| 5,247,364 A | 9/1993 | Banker et al. | 348/569 |
| 5,253,078 A | 10/1993 | Balkanski et al. | 382/250 |
| 5,257,119 A | 10/1993 | Funada et al. | 358/438 |
| 5,259,025 A | 11/1993 | Monroe | 705/75 |
| 5,267,334 A | 11/1993 | Normille et al. | 382/236 |
| 5,280,537 A | 1/1994 | Sugiyama et al. | 370/529 |
| 5,288,976 A | 2/1994 | Citron | 235/375 |
| 5,293,399 A | 3/1994 | Hefti | 340/10.34 |
| 5,295,203 A | 3/1994 | Krause et al. | 382/248 |
| 5,299,019 A | 3/1994 | Pack et al. | 382/236 |
| 5,305,400 A | 4/1994 | Butera | 382/107 |
| 5,315,098 A | 5/1994 | Tow | 235/494 |
| 5,319,453 A | 6/1994 | Copriviza et al. | 346/6 |
| 5,319,724 A | 6/1994 | Blonstein et al. | 713/200 |
| 5,319,735 A | 6/1994 | Preuss et al. | 704/205 |
| 5,325,167 A | 6/1994 | Melen | 356/71 |
| 5,327,237 A | 7/1994 | Gerdes et al. | 348/476 |
| 5,337,362 A | 8/1994 | Gormish et al. | 380/54 |
| 5,349,655 A | 9/1994 | Mann | 714/6 |
| 5,351,302 A | 9/1994 | Leighton et al. | 380/30 |
| 5,354,097 A | * 10/1994 | Tel | 283/107 |
| 5,371,792 A | 12/1994 | Asai et al. | 705/59 |
| 5,374,976 A | 12/1994 | Spannenburg | 399/366 |
| 5,379,345 A | 1/1995 | Greenberg | 455/2.01 |
| 5,387,941 A | 2/1995 | Montgomery et al. | 348/473 |
| 5,394,274 A | 2/1995 | Kahn | 360/27 |
| 5,396,559 A | 3/1995 | McGrew | 380/54 |
| 5,398,283 A | 3/1995 | Virga | 380/243 |
| 5,404,160 A | 4/1995 | Schober et al. | 725/20 |
| 5,404,377 A | 4/1995 | Moses | 375/145 |

| Patent | Date | Inventor | Class |
|---|---|---|---|
| 5,408,542 A | 4/1995 | Callahan | 382/244 |
| 5,416,307 A | 5/1995 | Danek et al. | 235/449 |
| 5,418,853 A | 5/1995 | Kanota et al. | 380/203 |
| 5,422,963 A | 6/1995 | Chen et al. | 382/222 |
| 5,422,995 A | 6/1995 | Aoki et al. | 345/545 |
| 5,425,100 A | 6/1995 | Thomas et al. | 725/20 |
| 5,428,606 A | 6/1995 | Moskowitz | 370/400 |
| 5,428,607 A | 6/1995 | Hiller et al. | 370/352 |
| 5,428,731 A | 6/1995 | Powers | 707/501.1 |
| 5,432,542 A | 7/1995 | Thibadeau et al. | 725/35 |
| 5,432,870 A | 7/1995 | Schwartz | 382/232 |
| 5,442,433 A * | 8/1995 | Hoshino et al. | 235/454 |
| 5,446,488 A | 8/1995 | Vogel | 725/151 |
| 5,450,122 A | 9/1995 | Keene | 725/22 |
| 5,450,490 A | 9/1995 | Jensen et al. | 380/53 |
| 5,461,426 A | 10/1995 | Limberg et al. | 348/425 |
| 5,463,209 A | 10/1995 | Figh | 235/383 |
| 5,469,222 A | 11/1995 | Sprague | 348/580 |
| 5,469,506 A | 11/1995 | Berson et al. | 713/186 |
| 5,473,631 A | 12/1995 | Moses | 375/130 |
| 5,479,168 A | 12/1995 | Johnson et al. | 341/110 |
| 5,481,294 A | 1/1996 | Thomas et al. | 725/20 |
| 5,488,664 A | 1/1996 | Shamir | 380/54 |
| 5,493,677 A | 2/1996 | Balogh | 707/104.1 |
| 5,495,581 A | 2/1996 | Tsai | 707/526 |
| 5,496,071 A | 3/1996 | Walsh | 283/70 |
| 5,499,294 A | 3/1996 | Friedman | 713/179 |
| 5,502,576 A | 3/1996 | Ramsay et al. | 358/444 |
| 5,515,081 A | 5/1996 | Vasilik | 345/545 |
| 5,521,722 A | 5/1996 | Colvill et al. | 358/500 |
| 5,524,933 A | 6/1996 | Kunt et al. | 283/67 |
| 5,530,751 A | 6/1996 | Morris | 380/202 |
| 5,530,759 A | 6/1996 | Braudaway et al. | 380/54 |
| 5,530,852 A | 6/1996 | Meske, Jr. et al. | 709/206 |
| 5,532,920 A | 7/1996 | Hartrick et al. | 715/500 |
| 5,537,223 A | 7/1996 | Curry | 358/3.28 |
| 5,539,471 A | 7/1996 | Myhrvold et al. | 348/473 |
| 5,539,735 A | 7/1996 | Moskowitz | 370/420 |
| 5,541,662 A | 7/1996 | Adams et al. | 348/460 |
| 5,544,255 A | 8/1996 | Smithies et al. | 382/119 |
| 5,548,646 A | 8/1996 | Aziz et al. | 713/153 |
| 5,557,333 A | 9/1996 | Jungo et al. | 348/473 |
| 5,559,559 A | 9/1996 | Jungo et al. | 348/432.1 |
| 5,568,179 A | 10/1996 | Diehl et al. | 725/143 |
| 5,568,550 A | 10/1996 | Ur | 382/306 |
| 5,568,570 A | 10/1996 | Rabbani | 382/238 |
| 5,572,010 A | 11/1996 | Petrie | 235/494 |
| 5,572,247 A | 11/1996 | Montgomery et al. | 725/139 |
| 5,576,532 A | 11/1996 | Hecht | 235/494 |
| 5,579,124 A | 11/1996 | Aijala et al. | 386/96 |
| 5,582,103 A | 12/1996 | Tanaka et al. | 101/32 |
| 5,587,743 A | 12/1996 | Montgomery et al. | 348/473 |
| 5,590,197 A | 12/1996 | Chen et al. | 205/65 |
| 5,594,226 A | 1/1997 | Steger | 235/379 |
| 5,598,526 A | 1/1997 | Daniel et al. | 345/540 |
| 5,602,920 A | 2/1997 | Bestler et al. | 380/212 |
| 5,606,609 A | 2/1997 | Houser et al. | 713/179 |
| 5,611,575 A | 3/1997 | Petrie | 283/67 |
| 5,613,004 A | 3/1997 | Cooperman et al. | 380/28 |
| 5,613,012 A | 3/1997 | Hoffman et al. | 382/115 |
| 5,614,940 A | 3/1997 | Cobbley et al. | 725/138 |
| 5,617,119 A | 4/1997 | Briggs et al. | |
| 5,617,148 A | 4/1997 | Montgomery | 348/473 |
| 5,629,770 A | 5/1997 | Brassil et al. | 358/426.12 |
| 5,629,980 A | 5/1997 | Stefik et al. | 705/54 |
| 5,636,292 A | 6/1997 | Rhoads | 382/232 |
| 5,638,443 A | 6/1997 | Stefik et al. | 705/54 |
| 5,638,446 A | 6/1997 | Rubin | 705/51 |
| 5,640,193 A | 6/1997 | Wellner | 725/100 |
| 5,646,999 A | 7/1997 | Saito | 705/54 |
| 5,652,626 A | 7/1997 | Kawakami et al. | 348/463 |
| 5,659,164 A | 8/1997 | Schmid et al. | 235/375 |
| 5,661,574 A | 8/1997 | Kawana | 358/501 |
| 5,663,766 A | 9/1997 | Sizer, II | 348/473 |
| 5,664,018 A | 9/1997 | Leighton | 380/54 |
| 5,665,951 A | 9/1997 | Newman et al. | 235/375 |
| 5,666,487 A | 9/1997 | Goodman et al. | 709/246 |
| 5,668,636 A | 9/1997 | Beach et al. | 358/296 |
| 5,671,282 A | 9/1997 | Wolff et al. | 713/179 |
| 5,673,316 A | 9/1997 | Auerbach et al. | 705/51 |
| 5,687,236 A | 11/1997 | Moskowitz et al. | 380/28 |
| 5,710,636 A | 1/1998 | Curry | 358/3.28 |
| 5,719,939 A | 2/1998 | Tel | 713/179 |
| 5,721,788 A | 2/1998 | Powell et al. | 382/100 |
| 5,727,092 A | 3/1998 | Sandford, II et al. | 382/251 |
| 5,735,547 A | 4/1998 | Morelle et al. | 283/67 |
| 5,740,244 A | 4/1998 | Indeck et al. | 713/176 |
| 5,742,845 A | 4/1998 | Wagner | 395/821 |
| 5,745,604 A | 4/1998 | Rhoads | 382/232 |
| 5,761,686 A | 6/1998 | Bloomberg | 707/529 |
| 5,768,426 A | 6/1998 | Rhoads | 382/232 |
| 5,778,102 A | 7/1998 | Sandford, II et al. | 382/251 |
| 5,790,693 A | 8/1998 | Graves et al. | 382/135 |
| 5,790,697 A | 8/1998 | Munro et al. | 382/135 |
| 5,804,803 A | 9/1998 | Cragun et al. | 235/375 |
| 5,809,160 A | 9/1998 | Powell et al. | 382/100 |
| 5,809,317 A | 9/1998 | Kogan et al. | 707/501.1 |
| 5,817,205 A | 10/1998 | Kaule | 382/294 |
| 5,818,441 A | 10/1998 | Throckmorton et al. | 345/717 |
| 5,819,289 A | 10/1998 | Sanford, II et al. | 707/104.1 |
| 5,825,871 A | 10/1998 | Mark | 379/357.03 |
| 5,825,892 A | 10/1998 | Braudaway et al. | 380/51 |
| 5,838,458 A | 11/1998 | Tsai | 358/402 |
| 5,841,886 A * | 11/1998 | Rhoads | 382/115 |
| 5,841,978 A | 11/1998 | Rhoads | 709/217 |
| 5,848,144 A | 12/1998 | Ahrens | 379/219 |
| 5,848,413 A | 12/1998 | Wolff | 707/10 |
| 5,852,673 A | 12/1998 | Young | 382/164 |
| 5,857,038 A | 1/1999 | Owada et al. | 382/284 |
| 5,862,218 A | 1/1999 | Steinberg | 713/176 |
| 5,862,260 A | 1/1999 | Rhoads | 382/232 |
| 5,869,819 A | 2/1999 | Knowles et al. | 235/375 |
| 5,871,615 A | 2/1999 | Harris | 162/140 |
| 5,872,589 A | 2/1999 | Morales | 725/24 |
| 5,875,249 A | 2/1999 | Mintzer et al. | 380/54 |
| 5,892,900 A * | 4/1999 | Ginter et al. | 713/200 |
| 5,893,101 A | 4/1999 | Balogh et al. | 707/100 |
| 5,898,779 A | 4/1999 | Squilla et al. | 713/176 |
| 5,900,608 A | 5/1999 | Iida | 235/381 |
| 5,902,353 A | 5/1999 | Reber et al. | 709/219 |
| 5,903,729 A | 5/1999 | Reber et al. | 709/219 |
| 5,905,248 A | 5/1999 | Russell et al. | 235/462.15 |
| 5,905,251 A | 5/1999 | Knowles | 235/472.01 |
| 5,905,810 A | 5/1999 | Jones et al. | 382/135 |
| 5,905,819 A * | 5/1999 | Daly | 358/1.9 |
| 5,913,210 A | 6/1999 | Call | 707/4 |
| 5,915,027 A | 6/1999 | Cox et al. | 380/54 |
| 5,930,767 A | 7/1999 | Reber et al. | 705/26 |
| 5,932,863 A | 8/1999 | Rathus et al. | 235/462.15 |
| 5,933,798 A | 8/1999 | Linnartz | |
| 5,933,829 A | 8/1999 | Durst et al. | 707/10 |
| 5,938,726 A | 8/1999 | Reber et al. | 709/217 |
| 5,938,727 A | 8/1999 | Ikeda | 709/218 |
| 5,939,695 A | 8/1999 | Nelson | 235/383 |
| 5,940,595 A | 8/1999 | Reber et al. | 709/227 |
| 5,943,422 A | 8/1999 | Van Wie et al. | |
| 5,949,055 A | 9/1999 | Fleet et al. | 235/469 |
| 5,950,173 A | 9/1999 | Perkowski | 705/26 |
| 5,963,916 A | 10/1999 | Kaplan | 705/26 |
| 5,971,277 A | 10/1999 | Cragun et al. | 235/462.01 |
| 5,974,141 A | 10/1999 | Saito | 705/52 |
| 5,974,150 A * | 10/1999 | Kaish et al. | 283/85 |

| | | | |
|---|---|---|---|
| 5,974,548 A | 10/1999 | Adams | |
| 5,978,773 A | 11/1999 | Hudetz et al. ................. | 705/23 |
| 5,979,757 A | 11/1999 | Tracy et al. ................. | 235/383 |
| 5,983,218 A | 11/1999 | Syeda-Mahmoo ............. | 707/3 |
| 5,991,426 A | 11/1999 | Cox et al. ................... | 382/100 |
| 5,995,625 A | 11/1999 | Sudia et al. | |
| 6,005,501 A | 12/1999 | Wolosewicz ................. | 341/52 |
| 6,021,196 A * | 2/2000 | Sandford et al. ........... | 380/213 |
| 6,024,287 A | 2/2000 | Takai et al. ................. | 235/493 |
| 6,035,177 A | 3/2000 | Moses et al. ................. | 725/22 |
| 6,052,486 A | 4/2000 | Knowlton et al. .......... | 382/232 |
| 6,064,764 A | 5/2000 | Bhaskaran et al. ......... | 382/183 |
| 6,122,403 A | 9/2000 | Rhoads ....................... | 382/233 |
| 6,166,750 A | 12/2000 | Negishi ...................... | 347/131 |
| 6,185,683 B1 | 2/2001 | Ginter et al. | |
| 6,188,787 B1 | 2/2001 | Ohmae et al. | |
| 6,208,746 B1 * | 3/2001 | Musgrave ................... | 382/100 |
| 6,243,480 B1 | 6/2001 | Zhao et al. ................. | 382/100 |
| 6,246,777 B1 | 6/2001 | Agarwal et al. ............ | 382/100 |
| 6,266,430 B1 | 7/2001 | Rhoads ....................... | 382/100 |
| 6,282,654 B1 | 8/2001 | Ikeda et al. ................. | 713/200 |
| 6,301,360 B1 | 10/2001 | Bocionek et al. | |
| 6,311,214 B1 | 10/2001 | Rhoads ....................... | 709/217 |
| 6,321,648 B1 | 11/2001 | Berson et al. | |
| 6,321,981 B1 | 11/2001 | Ray et al. | |
| 6,324,573 B1 | 11/2001 | Rhoads ....................... | 709/218 |
| 6,332,031 B1 | 12/2001 | Rhoads et al. ............. | 382/100 |
| 6,343,204 B1 | 1/2002 | Yang | |
| 6,345,104 B1 | 2/2002 | Rhoads ....................... | 382/100 |
| 6,359,985 B1 | 3/2002 | Koch et al. | |
| 6,389,151 B1 | 5/2002 | Carr et al. .................. | 382/100 |
| 2001/0017709 A1 | 8/2001 | Murakami et al. | |
| 2001/0021144 A1 | 9/2001 | Oshima et al. | |
| 2001/0024510 A1 | 9/2001 | Iwamura | |
| 2001/0026629 A1 | 10/2001 | Oki | |
| 2001/0030759 A1 | 10/2001 | Hayashi et al. | |
| 2001/0037455 A1 | 11/2001 | Lawandy et al. | |
| 2001/0049662 A1 | 12/2001 | Linnartz et al. | |
| 2001/0053299 A1 | 12/2001 | Matsunoshita et al. | |
| 2001/0054144 A1 | 12/2001 | Epstein et al. | |
| 2001/0055258 A1 | 12/2001 | Carson et al. | |
| 2002/0001095 A1 | 1/2002 | Kawakami et al. | |
| 2002/0003891 A1 | 1/2002 | Hoshino | |
| 2002/0018228 A1 | 2/2002 | Torigoe | |
| 2002/0051237 A1 | 5/2002 | Ohara | |

FOREIGN PATENT DOCUMENTS

| | | | | |
|---|---|---|---|---|
| DE | 19521969 C1 | 2/1997 | | |
| EP | 366381 A2 | 10/1989 | | |
| EP | 372 601 | 6/1990 | | |
| EP | 411 232 | 2/1991 | | |
| EP | 418 964 A1 | 3/1991 | | |
| EP | 441 702 | 8/1991 | | |
| EP | 493 091 | 7/1992 | | |
| EP | 058 482 | 8/1992 | | |
| EP | 551 016 | 7/1993 | | |
| EP | 581 317 | 2/1994 | | |
| EP | 605 208 | 7/1994 | | |
| EP | 649 074 | 4/1995 | | |
| EP | 705 025 | 4/1996 | | |
| EP | 711061 | 5/1996 | | |
| EP | 0789480 | 8/1997 | | |
| EP | 872995 | 10/1998 | | |
| EP | 0642060 B1 | 4/1999 | | |
| EP | 991047 | 4/2000 | | |
| EP | 1122939 | 8/2001 | | |
| EP | 1158514 | 11/2001 | | |
| GB | 2063018 | 5/1981 | | |
| GB | 2067871 | 7/1981 | | |
| GB | 2196167 | 4/1988 | | |
| GB | 2204984 | 11/1988 | | |
| JP | 4-248771 | 2/1992 | | |
| JP | 5/242217 | 9/1993 | | |
| JP | 8-30759 | 2/1996 | | |
| WO | WO 89/08915 | 9/1989 | | |
| WO | WO 93/25038 | 12/1993 | | |
| WO | WO94/27228 | 11/1994 | | |
| WO | WO95/04665 | 2/1995 | | |
| WO | WO95/10813 | 4/1995 | | |
| WO | WO 95/10835 | 4/1995 | | |
| WO | WO 95/14289 | 5/1995 | | |
| WO | WO 95/20291 | 7/1995 | | |
| WO | WO96/03286 | 2/1996 | | |
| WO | WO 96/26494 | 8/1996 | | |
| WO | WO 96/27259 | 9/1996 | | |
| WO | WO 96 36163 | * 11/1996 | | |
| WO | WO97/40619 | 10/1997 | | |
| WO | WO97/43736 | 11/1997 | | |
| WO | WO98/14887 | 4/1998 | | |
| WO | WO98/20642 | 5/1998 | | |
| WO | WO98/24050 | 7/1998 | | |
| WO | WO98/40823 | 9/1998 | | |
| WO | WO98/49813 | 11/1998 | | |
| WO | WO99/34277 | 7/1999 | | |
| WO | WO99/36876 | 7/1999 | ................. | 382/100 |
| WO | WO00/44131 | 7/2000 | | |
| WO | WO00/62258 | 10/2000 | | |
| WO | WO 01/08405 | 2/2001 | | |
| WO | WO 01/80169 | 10/2001 | ................. | 382/100 |
| WO | WO02/03328 | 1/2002 | | |

OTHER PUBLICATIONS

Szepanski, "A Signal Theoretic Method for Creating Forgery–Proof Documents for Automatic Verification," Proceedings 1979 Carnahan Conference on Crime Countermeasures, May 16, 1979, pp. 101–109.

Dautzenberg, "Watermarking Images," Department of Microelectronics and Electrical Engineering, Trinity College Dublin, 47 pages, Oct. 1994.

Szepanski, "Additive Binary Data Transmission for Video Signals," Conference of the Communications Engineering Society, 1980, NTG Technical Reports, vol. 74, pp. 343–351. (German text and English translation enclosed).

*Audio Watermarking Architectures for Secure Digital Music Distribution, A Proposal to the SDMI Portable Devices Working Group* by ARIS Technologies, Inc, Mar. 26, 1999, pp. 1–11.

*Audio Watermarking Architectures for Persistent Protection, Presentation to SDMI PDWG*, Mar. 29, 1999, J. Winograd, Aris Technologies, pp. 1–16.

*Audio Watermarking System to Screen Digital Audio Content for LCM Acceptance, A Proposal Submitted in Response to PDWG990050504—Transition CfP* by ARIS Technologies, Inc., May 23, 1999, Document Version 1.0, 15 pages.

Boland et al., "Watermarking Digital Images for Copyright Protection", *Fifth Int'l Conference on Image Processing and it's Application*, Jul. 1995, pp. 326–330.

Levy, "AIPL's Proposal for SDMI: An Underlying Security System" (slide presentation), Mar. 29, 1999, 23 slides.

*Microsoft Response to CfP for Technology Solutions to Screen Digital Audio Content for LCM Acceptance*, SDMI, PDWG Tokyo, May 23, 1999, 9 pages.

*Response to CfP for Technology Solutions to Screen Digital Audio Content for LCM Acceptance*, NTT Waveless Radio Consotium, May 23, 1999, 9 pages.

Sandford II et al., "The Data Embedding Method", *Processing of the SPIE* vol. 2615, pp. 226–259, 1996.

Thomas, Keith, *Screening Technology for Content from Compact Discs*, May 24, 1999, 11 pages.

Tirkel et al., "Electronic Water Mark," *Dicta–93*, Marquarie University, Sydney, Australia, Dec., 1993, pp. 666–672.

Vidal et al., "Non–Noticeable Information Embedding in Color Images: Marking and Detection", *IEEE* 1999, pp. 293–297.

Wolfgang et al., "A Watermark for Digital Images," *Computer Vision and Image Processing Laboratory, Purdue University*, Sep. 1996, pp. 219–222.

U.S. patent application Ser. No. 60/071,983, Levy, filed Jan. 20, 1998.

U.S. patent application Ser. No. 09/404,291, Levy, filed Sep. 23, 1999.

U.S. patent application Ser. No. 60/114,725, Levy, filed Dec. 31, 1998.

U.S. patent application Ser. No. 09/234,780, Rhoads et al., filed Jan. 20, 1999.

U.S. patent application Ser. No. 60/116,641, Cookson, filed Jan. 21, 1999.

U.S. patent application Ser. No. 09/478,713, Cookson, filed Jan. 6, 2000.

Cookson, Chris, General Principles of Music Uses on Portable Devices, presented to SDMI, Mar. 5, 1999.

Winograd, J.M., "Audio Watermarking Architecture for Secure Digital Music Distribution," a Proposal to the SDMI Portable Devices Working Group, by Aris Technologies, Inc., Mar. 26, 1999.

Mintzer et al., "Safeguarding Digital Library Contents and Users: Digital Watermarking," D–Lib Magazine, Dec. 1997, 12 pages.

Tirkel et al., "Electronic Water Mark," DICTA–93, Macquarie University, Sydney, Australia, Dec., 1993, pp. 666–673.

Weber et al., "Correlative Image Registration," Seminars in Nuclear Medicine, vol XXIV, No. 4, Oct., 1994, pp. 311–323.

Brassil et al., Electronic Marking and Identification Techniques to Discourage Document Copying, Proceedings of the INFOCOM '94 Conference on Computer, IEEE Commun. Soc Conference, Jun. 12–16, 1994, 1278–1287.

Bruckstein, A.M.; Richardson, T.J., A holographic transform domain image watermarking method, Circuits, Systems, and Signal Processing vol. 17, No. 3, p. 361–89, 1998. This paper includes an appendix containing an internal memo of Bell Labs, which according to the authors of the paper, was dated Sep. 1994.

"High Water FBI Limited Presentation Image Copyright Protection Software," FBI Ltd brochure, Jul., 1995, 17 pages.

Koch et al., "Copyright Protection for Multimedia Data," Fraunhofer Institute for Computer Graphics, Dec. 16, 1994, 15 pages.

Koch et al., "Towards Robust and Hidden Image Copyright Labeling," Proc. of 1995 IEEE Workshop on Nonlinear Signal and Image Processing, Jun. 20–22, 1995, 4 pages.

Kurak et al., "A Cautionary Note On Image Downgrading," 1992 IEEE, pp. 153–159.

Mintzer et al., "Safeguarding Digital library Contents and Users" Digital Watermarking, D–Lib Magazine, Dec. 1997: ISSN 1082–9873.

Rindfrey, "Towards an Equitable System for Access Control and Copyright Protection in Broadcast Image Services: The Equicrypt Approach," Intellectual Property Rights and New Technologies, Proc. of the Conference, R. Oldenbourg Verlag Wien Munchen 1995, 12 pages.

Schreiber et al., "A Compatible High–Definition Television System Using the Noise–Margin Method of Hiding Enhancement Information," SMPTE Journal, Dec. 1989, pp. 873–879.

SDMI Example Use Scenarios (Non–Exhaustive), Version 1.2, Jun. 16, 1999.

Szepanski, "A Signal Theoretic Method for Creating Forgery–Proof Documents for Automatic Verification," Proceedings 1979 Carnahan Conference on Crime Countermeasures, May 16, 1979, pp. 101–109.

Szepanski, "Additive Binary Data Transmission for Video Signals," Papers Presented at Conf. Of Comm. Engineering Soc. Sep. 30–Oct. 3, 1980, Technical Reports vol. 74, pp. 342–352.

Tanaka et al., "A Visual Retrieval System with Private Information for Image Database," Proceeding International Conference on DSP Applications and Technology, Oct. 1991, pp. 415–421.

Tanaka et al., "New Integrated Coding Schemes for Computer–Aided Facsimile," Proc. IEEE Int'l Conf. on Sys. Integration, Apr. 1990, pp. 275–281.

U.S. patent application Ser. No. 60/000,442, Hudetz, filed Jun. 6, 1995.

U.S. patent application Ser. No. 60/082,228, Rhoads, filed Apr. 16, 1998.

U.S. patent application Ser. No. 60/141,763, Davis, filed Jun. 30, 1999.

U.S. patent application Ser. No. 60/158,015, Davis et al., filed Oct. 6, 1999.

U.S. patent application Ser. No. 09/314,648, Rodriguez et al., filed May 19, 1999.

U.S. patent application Ser. No. 60/198,138, Alattar, filed Apr. 17, 2000.

U.S. patent application Ser. No. 60/198,849, Carr et al., filed Apr. 21, 2000.

U.S. patent application Ser. No. 09/198,022, Rhoads, filed Nov. 23, 1998.

U.S. patent application Ser. No. 09/498,223, Rhoads et al., filed Feb. 3, 2000.

U.S. patent application Ser. No. 09/525,865, Davis et al., filed Mar. 15, 2000.

U.S. patent application Ser. No. 09/571,422, Rhoads et al., filed May 15, 2000.

U.S. patent application Ser. No. 09/585,678, Ellingson, filed Jun. 1, 2000.

"Access Control and COpyright Protection for Images, WorkPackage 8: Watermarking," Jun. 30, 1995, 46 pages.

"Access Control and COpyright Protection for Images, WorkPackage 3: Evaluation of Existing Systems," Apr. 19, 1995, 68 pages.

"Access Control and COpyright Protection for Images, WorkPackage 1: Access Control and Copyright Protection for Images Need Evaluation," Jun., 1995, 21 pages.

"Access Control and COpyright Protection for Images, Conditional Access and Copyright Protection Based on the Use of Trusted Third Parties," 1995, 43 pages.

Arachelian, "White Noise Storm," Apr. 11, 1994, Internet reference, 13 pages.

Arazi, et al., "Intuition, Perception, and Secure Communication," IEEE Transactionson Systems, Man, and Cybernetics, vol. 19, No. 5, Sep./Oct. 1989, pp. 1016–1020.

Arthur, "Digital Fingerprints Protect Artwork," New Scientist, Nov. 12, 1994, p. 24.

Aura, "Invisible Communication," Helsinki University of Technology, Digital Systems Laboratory, Nov. 5, 1995, 13 pages.

Bender et al, "Techniques for Data Hiding," Draft Preprint, Private Correspondence, dated Oct. 30, 1995.

Bender et al., "Techniques for Data Hiding," Massachusetts Institute of Technology, Media Laboratory, Jan. 1995, 10 pages.

Boneh, "Collusion–Secure Fingerprinting for Digital Data," Department of Computer Science, Princeton University, 1995, 31 pages.

Boney et al., "Digital Watermarks for Audio Signals," Proceedings of Multimedia '96, 1996 IEEE, pp. 473–480.

Boucqueau et al., Equitable Conditional Access and Copyright Protection for Image Based on Trusted Third Parties, Teleservices & Multimedia Communications, 2nd Int. Cost 237 Workshop, Second International Cost 237 Workshop, Nov., 1995; published 1996, pp. 229–243.

Brassil et al., "Hiding Information in Document Images," Nov., 1995, 7 pages.

Brown, "S–Tools for Windows, Version 1.00, .COPYRGT. 1994 Andy Brown, What is Steganography," Internet reference, Mar. 6, 1994, 6 pages.

Bruyndonckx et al., Neural Network Post–Processing of Coded Images Using Perceptual Masking, 1994, 3 pages.

Bruyndonckx et al., "Spatial Method for Copyright Labeling of Digital Images," 1994, 6 pages.

Burgett et al., "A Novel Method for Copyright Labeling Digitized Image Data," requested by e–mail from author (unavailable/password protected on IGD WWW site); received Sep. 18, 1995, 12 pages.

Caronni, "Assuring Ownership Rights for Digital Images," Published in the Proceedings of Reliable IT Systems, VIS '95, HH. Bruggemann and W. Gerhardt–Hackl (Ed.), Vieweg Publishing Company, Germany, 1995, Jun. 14, 1994, 10 pages.

Caruso, "Digital Commerce, 2 plans for watermarks, which can bind proof of authorship to electronic works." New York Times, Aug. 7, 1995, one page.

Castro et al., "Registration of Translated and Rotated Images Using Finite Fourier Transforms," IEEE Transactions on Pattern Analysis and Machine Intelligence, vol. PAMI–9, No. 5, Sep. 1987, pp. 700–703.

Choudhury, et al., "Copyright Protection for Electronic Publishing over Computer Networks," IEEE Network Magazine, Jun. 1994, 18 pages.

Clarke, "Invisible Code Tags Electronic Images," Electronic Engineering Times, Jun. 12, 1995, n. 852, p. 42.

"Copyright Protection for Digital Images, Digital Fingerprinting from FBI," Highwater FBI brochure, 1995, 4 pages.

"The Copyright Can of Worms Opened Up By The New Electronic Media," Computergram Internations, pCGN07170006, Jul. 17, 1995 and "The Copyright Can of Worms Opened Up By the New Electronic Media—2," Computergram Internations, pCGN07210008, Jul. 21, 1995, 3 pages total.

Cox et al., "Secure Spread Spectrum Watermarking for Multimedia," NEC Research Institute Technical Report, Dec. 5, 1995, 33 pages.

Cox et al., "A Secure, Imperceptable Yet Perceptually Salient, Spread Spectrum Watermark for Multimedia," IEEE, Southcon/96, Conference Record, pp. 192–197, 1996.

"Cyphertech Systems: Introduces Digital Encoding Device to Prevent TV Piracy," Hollywood Reporter, Oct. 20, 1993, p. 23.

Delaigle et al., "Digital Watermarking," Proc. SPIE—Int. Soc. Opt. Eng., vol. 2659, pp. 99–110, 1996.

Delaigle et al., "A Psychovisual Approach for Digital Picture Watermarking," 1995, 20 pages.

DICE Digital Watermark System, Q&A, Dec., 1995, 12 pages.

Digimarc presentation at RSA Conference, approximately Jan. 17, 1996, 4 pages.

Fimmerstad, "The Virtual Art Museum," Ericsson Connexion, Dec., 1995, pp. 29–31.

Fitzgerald, "Invisible Digital Copyright ID," Editor & Publisher, Jun. 25, 1994, p. 62.

"Foiling Card Forgers With Magnetic Noise," Wall Street Journal, Feb. 8, 1994.

Frequently Asked Questions About Digimarc Signature Technology, Aug. 1, 1995, HTTP:WWW.DIGIMARC.COM, 9 pages.

Friedman, "The Trustworthy Digital Camera: Restoring Credibility to the Photographic Image," IEEE Transactions on Consumer Electronics, vol. 39, No. 4, Nov., 1993, pp. 905–910.

Gabor, et al., "Theory of Communication," J. Inst. Elect. Eng. 93, 1946, pp. 429–441.

Hartung et al., Digital Watermarking of Raw and Compressed Video, Proc. SPIE 2952, Digital Compression Technologies and Systems for Video Communications, Oct., 1996, pp 205–213.

Hecht, "Embedded Data Glyph Technology for Hardcopy Digital Documents," SPIE vol. 2171, Feb. 1994, pp. 341–352.

"Holographic signatures for digital images," The Seybold Report on Desktop Publishing, Aug. 1995, one page.

Humphrey, "Stamping Out Crime," Hollywood Reporter, Jan. 26, 1994, p. S48.

Jain, "Image Coding Via a Nearest Neighbors Image Model," IEEE Transactions on Communications, vol. COM–23, No. 3, Mar. 1975, pp. 318–331.

Johhnson, "Steganography," Dec. 10, 1995, 32 pages.

JPEG Group's JPEG Software (release 4), FTP.CSU-A.BEREKELEY.EDU/PUB/CYPHERPUNKS/APPLICATIONS/JSTEG/JPEG.ANNOUNCEMENT.GZ.

Kassam, Signal Detection in Non–Gaussian Noise, Dowden & Culver, 1988, pp. 1–96.

Koch et al., "Digital Copyright Labeling: Providing Evidence of Misuse and Tracking Unauthorized Distribution of Copyrighted Materials," Oasis Magazine, Dec. 1995, 3 pages.

Luc, "Analysis of Spread Spectrum System Parameters for Design of Hidden Transmission," Radioengineering, vol. 4, No. 2, Jun. 1995, pp. 26–29.

Machado, "Announcing Stego 1.0a2, The First Steganography Tool for the Macintosh," Internet reference, Nov. 28, 1993, 3 pages.

Macq, "Cryptology for Digital TV Broadcasting," Proceedings of the IEEE, vol. 83, No. 6, Jun. 1995, pp. 944–957.

Matthews, "When Seeing is Not Believing," New Scientist, Oct. 16, 1993, pp. 13–15.

Matsui et al., "Video–Steganography: How to Secretly Embed a Signature in a Picture," IMA Intellectual Property Project Proceedings, Jan. 1994, vol. 1, Issue 1, pp. 187–205.

Mintzer et al., "Toward on–line, Worldwide Access to Vatican Library Materials," IBM J. Res. Develop. vol. 40 No. 2, Mar., 1996, pp. 139–162.

Moller, et al., "Rechnergestutzte Steganographie: Wie sie Funktioniert und warum folglich jede Reglementierung von Verschlusselung unsinnig ist," DuD, Datenschutz und Datensicherung, Jun. 18, 1994 318–326.

"NAB—Cyphertech Starts Anti–Piracy Broadcast Tests," Newsbytes, NEW03230023, Mar. 23, 1994.

Nakamura et al., "A Unified Coding Method of Image and Text Data Using Discrete Orthogonal Transform," Systems and Computers in Japan, vol. 21, No. 3, 1990, pp. 87–92.

Nakamura et al., "A Unified Coding Method of Dithered Image and Text Data Using Micropatterns," Electronics and Communications in Japan, Part 1, vol. 72, No. 4, 1989, pp. 50–56.

New Product Information, "FBI at AppleExpo" (Olympia, London), Nov., 1995, 2 pages.

Ohnishi et al., Embedding a Seal into a Picture Under Orthogonal Wavelet Transform, Proceedings of Multimedia '96, 1996, IEEE, pp. 514–421.

ORuanaidh et al, "Watermarking Digital Images for Copyright Protection," http://www.kalman.mee.tcd.ie/people/jjr/eva.sub.—pap.html, Feb. 2, 1996, 8 pages. (Also published Aug., 1996, IEE Proceedings–Vision, Image and Signal Processing, vol. 143, No. 4, pp. 250–256.).

Pennebaker et al., JPEG Still Image Data Compression Standard, Chapter 3, "Aspects of the Human Visual System," pp. 23–27, 1993, Van Nostrand Reinhold, New York.

Pickholtz et al., "Theory of Spread–Spectrum Communications—A Tutorial," Transactions on Communications, vol. COM–30, No. 5, May, 1982, pp. 855–884.

Pitas et al., "Applying Signatures on Digital Images," IEEE Workshop on Nonlinear Image and Signal Processing, Neos Marmaras, Greece, pp. 460–463, Jun., 1995.

Port, "Halting Highway Robbery on the Internet," Business Week, Oct. 17, 1994, p. 212.

Roberts, "Picture Coding Using Pseudorandom Noise," IRE Trans. on Information Theory, vol. 8, No. 2, Feb., 1962, pp. 145–154.

Sapwater et al., "Electronic Copyright Protection," Photo<Electronic Imaging, vol. 37, No. 6, 1994, pp. 16–21.

Schneier, "Digital Signatures, Cryptographic Algorithms Can Create Nonforgeable Signatures for Electronic Documents, Making Them Valid Legal Instruments" BYTE, Nov. 1993, pp. 309–312.

shaggy@phantom.com, "Hide and Seek v. 4.0," Internet reference, Apr. 10, 1994, 3 pages.

Short, "Stepts Toward Unmasking Secure Communications," International Journal of Bifurcation and Chaos, vol. 4, No. 4, 1994, pp. 959–977.

Simmons, "Subliminal Channels; Past and Present," ETT, vol. 5, No. 4, Jul.–Aug. 1994, pp. 45–59.

Sheng et al., "Experiments on Pattern Recognition Using Invariant Fourier–Mellin Descriptors," Journal of Optical Society of America, vol. 3, No. 6, 1986, pp. 771–776.

Sklar, "A Structured Overview of Digital Communications—a Tutorial Review—Part I," IEEE Communications Magazine, Aug., 1983, pp. 1–17.

Sklar, "A Structured Overview of Digital Communications—a Tutorial Review—Part II," IEEE Communications Magazine, Oct., 1983, pp. 6–21.

"Steganography," Intellectual Property and the National Information Infrastructure The Report of the Working Group on Intellectual Property Rights, Sep. 1995, pp. 212–213.

Tanaka et al., "Embedding Secret Information Into a Dithered Multi–Level Image," Proc. IEEE Military Comm. Conf., Sep. 1990, pp. 216–220.

Tanaka, "Embedding the Attribute Information Into a Dithered Image," Systems and Computers in Japan, vol. 21, No. 7, 1990, pp. 43–50.

Tirkel et al., "A Two–Dimensional Digital Watermark," 1995, 6 pages.

Toga et al., "Registration Revisted," Journal of Neuroscience Methods, 48 (1993), pp. 1–13.

van Schyndel et al., "Towards a Robust Digital Watermark," ACCV '95, vol. 2, Dec., 1995, pp. 504–508.

Wagner, "Fingerprinting," 1983 IEEE, pp. 18–22.

Walton, "Image Authentication for a Slippery New Age," Dr. Dobb's Journal, Apr. 1995, pp. 18–26, 82–87.

"Watermarking & Digital Signature: Protect Your Work!" Published on Internet 1996, http://Itswww.epfl.ch/.about.jordan/watermarking.html.

Wise, "The History of Copyright, Photographers' Rights Span Three Centuries," Photo<Electronic Imaging, vol. 37, No. 6, 1994.

van Schyndel et al., "A Digital Watermark," IEEE International Conference on Image Processing, Nov. 13–16, 1994, pp. 86–90.

Zhao et al., "Embedding Robust Labels Into Images for Copyright Protection," Proc. of the International Congress on Intellectual Property Rights for Specialized Information, Knowledge and new Technologies (Vienna, Austria) Aug. 21–25, 1995, 10 pages.

Bender, "Applications for Data Hiding," IBM Systems Journal, vol. 39, No. 3–4, pp. 547–68, 2000.

Gruhl et al., "Information Hiding to Foil the Casual Counterfeiter," Proc. 2d Information Hiding Workshop, LNCS vol. 1525, pp. 1–15 (Apr. 15, 1998).

* cited by examiner

US 6,788,800 B1

AUTHENTICATING OBJECTS USING EMBEDDED DATA

RELATED APPLICATION DATA

The subject matter of the present application is related to that disclosed in U.S. Pat. No. 5,862,260, and in co-pending application Ser. No. 09/503,881, filed Feb. 14, 2000; which are hereby incorporated by reference.

TECHNICAL FIELD

The invention relates to methods for authenticating objects, and in particular, relates to methods for embedding security data into products, and methods for authenticating these products using the embedded security data.

BACKGROUND AND SUMMARY

Counterfeiting and piracy have a huge economic impact. While numerous product security features have been developed, there remains a demand for cost effective security measures that inhibit counterfeiting and piracy.

Research in the field of steganography (also called "data hiding") offers promising technology for combating counterfeiting and piracy. One form of steganography is referred to in popular literature as digital watermarking. Digital watermarking is a process for modifying a host signal or object to embed a machine-readable code into the host. The host may be modified such that the embedded code is imperceptible or nearly imperceptible to the ordinary observer upon viewing or playback, yet may be detected through an automated detection process.

Most commonly, digital watermarking is applied to media such as images, audio signals, and video signals. However, it may also be applied to other types of media, including documents (e.g., through subtle line, word or character shifting), software, multi-dimensional graphics models, and surface textures of objects.

The invention relates to methods for authenticating products using embedded security data in the product. One aspect of the invention is a method of making a secure product using data hidden in the product itself. This method assigns a product identifier to the product, such as a unique serial number. It also steganographically embeds security data into the product. The security data includes the product identifier (e.g., a hashed version of it). The security data is embedded such that it is machine readable and enables automated authentication of the product by comparing the security data decoded from the product with the product identifier.

Another aspect of the invention is a method of authenticating a product using embedded security data. This method receives a product identifier associated with the product, and decodes security data steganographically embedded into the product. It then validates the product by comparing the decoded security data with the product identifier.

Another aspect of the invention is a product that includes security data steganographically embedded into it. The product is assigned a product identifier that is related to the security data. The relationship between the product identifier is defined such that authenticity of the product may be evaluated by comparing the security data decoded from the product with the product identifier.

In this document, the term "product" broadly encompasses physical objects (e.g., goods), and other objects associated with them like packaging, tags, labels, documentation, and media supplied on, by, or with the object. Within this broad product context, the embedding process may encode security data on any of these types of products. To determine whether a product is authentic, the methods and systems described in this document can be used to evaluate security data embedded on the product itself, its packaging, labels, tags, media, etc.

One implementation of these methods and secure products employs a form of steganography referred to as digital watermarking. However, other forms of steganography may be used as well. Further features will become apparent with reference to the following detailed description and accompanying drawings.

DETAILED DESCRIPTION

Introduction

The following sections describe a system and related methods for authenticating products. While the description illustrates the system with an example of packaged software product, it applies to a variety of types of objects. There are two principal parts of the product authentication architecture: 1) a system for embedding authentication data into the product; and 2) a system for authenticating the product.

Typically, product makers assign unique identifiers, such as product serial numbers, to each product. In the product security systems describe below, an embedder encodes the serial number as a form of machine readable security data into the product or its packaging. This embedded security data is then used to authenticate the product and/or control unauthorized use. In the case of software products, for example, the embedded security data may be used to ensure that the user is authorized during installation of the software on the user's machine. In the case of financial or access cards (e.g., debit/credit cards, key cards, corporate badges), the embedded security data may be used to activate the card. In the more general case, the embedded security data may be used to check whether a product is authentic by validating a conspicuous product identifier, such as a visible serial number, with one imperceptibly embedded in the product or its packaging. These systems are detailed further below.

Embedding Security Data Into a Product

Figure 1:
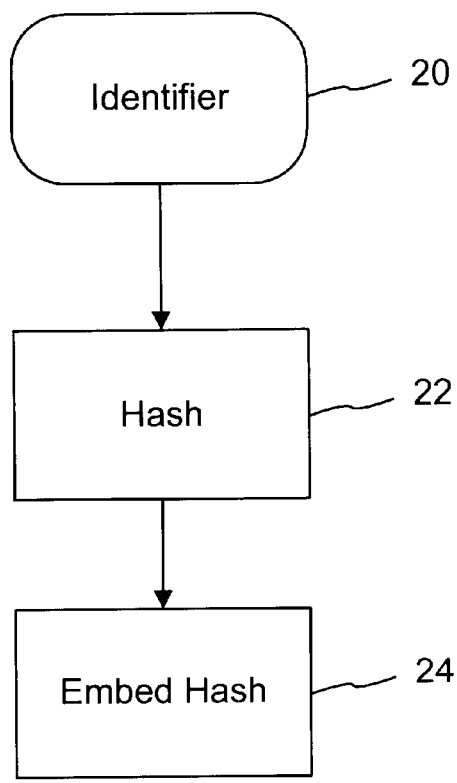
FIG. 1 is a flow diagram illustrating a method for embedding an object identifier into an object.

FIG. 1 is a flow diagram illustrating a method for embedding security data into a product. The maker or distributor of the product assigns a unique identifier, such as a serial number, to the product. The embedding process takes this identifier 20 and transforms it into a form of data for embedding in the product or its packaging. While the identifier need not be modified before embedding it, there are a number of reasons for doing so. One reason is to convert it into a more compact form for embedding. Another reason is to make the embedded data more secure, i.e. more difficult for counterfeiters or pirates to replicate.

FIG. 1 depicts an example of a data conversion method called a hash 22. The hash is a function that converts the identifier into another number. One form of hash is a checksum, but there are many others. One example of a checksum is one that converts a number or set of numbers (e.g., serial number, product code, etc.) into another number using a sequence of prime numbers. A cryptographic hash may be used to generate a new number from which the original identifier is difficult to derive. Whether hashed or not, the data to be embedded is referred to as "security data."

The embedding process embeds the security data into a machine readable code on the product or its packaging (24).

In particular, the process steganographically embeds the security data into the machine readable code on the product or on packaging or labels for the product. A steganographic process embeds information on the product's surface such that is imperceptible or substantially imperceptible upon ordinary inspection, yet readable by machine.

One form of steganography is called digital watermarking. A variety of digital watermarking schemes may be used to embed the watermark onto the print media. Some example watermark encoding and decoding schemes are provided in U.S. Pat. No. 5,862,260, and in co-pending application Ser. No. 09/503,881, filed Feb. 14, 2000.

In digital watermarking of images printed on physical objects, there is a tradeoff between visual perceptibility and survivability of the watermark. In this application, the watermark is embedded so as to be sufficiently robust to survive analog to digital conversion, digital to analog conversion, and possible other forms of corruption, including geometric distortion, additive noise, and compression. The watermark may be encoded by altering the luminance or one or more other color channels of an image printed on the surface of the product. Alternatively, the watermark may be encoded using clear inks that modulate the microtopology of the product's surface or that are readable when exposed to light in non-visible wavelengths, like UV or infrared. Also, the microtopology of the product surface may be altered in the process of creating the product surface so as to embed a watermark. Alternative machine readable codes may be used as well, such as data glyphs, invisible bar codes, etc.

A digital watermark embedding process typically involves several operations. For example, additional data may be appended to the security data, such as synchronization symbols, error detection codes, etc. After adding this data, the security data includes a sequence of symbols for embedding into the product. Additional operations include error correction and other forms of symbol encoding (e.g., convolution codes, turbo codes, BCH codes, Reed Solomon encoding, M sequences, gold sequences, etc.). These operations transform the original message sequence into a message signal. The message signal may then be further replicated and modulated using spread spectrum modulation techniques. For example, the message signal may be spread over a pseudorandom number or set of pseudorandom numbers and repetitively scattered throughout a host signal.

The host signal (sometimes referred to as the cover signal) is the signal in which the embedded data is hidden. This might be an image printed on an object, label or package, a layer of visible or invisible inks, line art, text, surface topology of an object, etc. The watermark signal may be replicated in several different contiguous or overlapping regions of the host signal. Each instance of the watermark at these regions can be associated with a corresponding imperceptible watermark template, synchronization or orientation signal that enables the decoder to detect the presence of the watermark and determine its orientation parameters such as translation (x, y coordinates of an origin), rotation, scale, shear, differential scale, etc.

To embed the message signal, an embedding function subtly changes the host signal. Digital watermarks usually operate on a digital form of the host signal to create a digital watermarked signal, which is then converted to analog form. However, the digital watermark may also be applied in the analog domain. A variety of embedding functions have been detailed in the literature about digital watermarking. These functions may be additive, multiplicative (adding or multiplying a message signal with the host signal), or some other function.

For enhanced security, various elements of the embedded data may be encrypted. Some or all of the watermark message, including the security data in the message may be encrypted. Various keys used to encode the watermark may be encrypted as well. For example, a key that defines the location of the watermark signal in the host signal may be encrypted. A key used to decode the spread message signal (e.g., a pseudorandom number) may also be encrypted.

In implementations where instances of the watermark signal are repeated in the host signal, a key in the message payload of one instance of a watermark signal may be used to decrypt a message, such as the security data, in other instance of the watermark signal. The key may be included in a message payload by appending the key to the message or combining it with the message using some function such as an XOR, or multiplication operation that combines the key with the message to create a composite message.

Keys used to decode the watermark or its message payload may also be derived from the host signal itself or from another watermark in the host signal.

Digital watermarks provide a low cost, yet secure method of embedding security data into a product or its packaging. The embedding process can be integrated into the process of printing the object or its packaging. For example, for each product, the printing process may be adapted to print an image embedded with the product's identifier or hashed form of it. This process may be integrated in the mass production of a variety of printable objects, like packaging, containers, labels, product documentation, credit cards, etc.

Authenticating a Product Using Embedded Security Data

Figure 2:
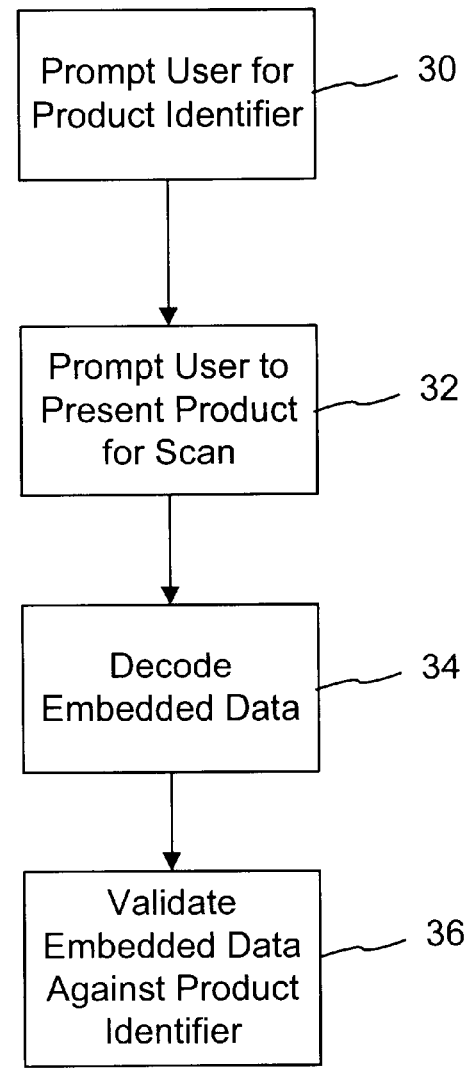
FIG. 2 is a flow diagram illustrating a method for authenticating an object using the embedded object identifier.

FIG. 2 is a flow diagram illustrating a process for authenticating a product using embedded security data. The authentication system includes a user interface, scanner and embedded data decoder. In the case where the embedded data is encoded in a digital watermark, the system may be implemented in a personal computer equipped with an imaging device, such as a CCD camera or scanner.

Authentication begins by prompting the user for the product identifier (30). Typically, this identifier is a product serial number in plain view on the product, its packaging or documentation. The user may enter the product number by simply typing it on a keyboard, or using some other user input device (voice recognition, bar code scanner, etc.) In response to receiving the product identifier, the system prompts the user to present the product for scanning (32). The user then scans the product with a sensor device, such as a CCD camera, to capture a product scan.

Next, the system decodes the embedded data from the product scan (34). In the case of security data embedded in digital watermark on the product, the system scans one or more image frames of the product. It then proceeds to detect the watermark in this image signal. Finding a watermark, it decodes the watermark message, including any security data.

To validate the security data (36), the authentication system re-computes the security data from the product identifier entered by the user. It then compares the computed security data with the decoded security data. If the two sets of security data match, then the system deems the product to be valid.

A variety of actions may be triggered by the outcome of the validation process 36. One action is to convey the output of the validation process to the user via a user interface, such as audio output, graphical user interface, etc. This type of operation could be used to authenticate any type of product using an authentication system implemented in a personal computer with an image sensor and software for executing the authentication operations.

In the case of a software product, the validation process (36) can automatically launch installation of the software on the user's computer. A variety of additional post-validation actions may be triggered automatically, such as establishing a connection to another computer (e.g., web server) to facilitate on line registration of the product, downloading of additional software or other content, retrieval of one or more keys that enable the software's operation, etc.

The same actions also apply to other types of products that execute machine instructions from a machine readable memory device. For example, hardware devices with embedded software or firmware could be authenticated in a similar fashion. In particular, the user would enter a product number into a user interface of the device, or another device in communication with it (a nearby PC connected via a wire or wireless port-USB, Firewire, Bluetooth, Infrared link, etc.). The user interface then would prompt the user to scan the product with a camera connected directly to the device being authenticated or indirectly through another device (e.g., the nearby PC). An embedded data decoder would then detect and decode any security data and take actions triggered by the result of the validation process. One action would be to install software to the device being authenticated from a nearby device or computer network. Another action would be to load one or more keys or other instructions that enable functionality of the device being authenticated.

The application of the authentication system to the registration and installation of software and embedded systems may be extended more generally to many forms of digital content, such as software, music, movies, games, etc. In each of these applications, the authentication method and system is similar. The digital content being authenticated may be packaged on a variety of storage media, such as an optical disk, magnetic disk, flash memory card, etc. The storage media or its packaging (e.g., a DVD case) includes embedded security data that is readable by machine and that is validated against a product identifier. The validation process may trigger actions relating to the digital content stored on the storage medium, such as control rendering of the content, control transfer of the content from the storage medium to another device, control usage of the content (e.g., number of copies, transfers, etc. allowed), linking to a network to retrieve related information or actions (e.g., linking to a product web site to get more information, license rights or purchase products or services).

The method depicted in FIG. 2 is also applicable to activation of financial and access cards like credit/debit cards, card keys, corporate badges that include keys for accessing buildings, computer systems (including access to a single machine or access to network resources), etc. To illustrate this application, consider an implementation of the authentication system on a network. First, the user receives a new card along with an identifier. This identifier might be one printed conspicuously on the card or given to the user separately (e.g., such as a corporate personnel number). The user enters this identifier and scans the card with an image sensor (e.g., a PC camera, flatbed scanner, etc.) An embedded data decoding process extracts security data, if any, from the scanned image, and validates it against the data entered by the user. If the embedded data is valid, then the authentication system activates the card.

While the system for activating cards can be implemented on a stand alone computer system, it may be more commonly implemented in a network configuration. The system might be implemented in a client server architecture where a client computer at the user's location performs object scanning and decoding functions, and the server at a remote location validates the embedded data against data supplied by the user. The locations of computer processes that perform the various card activation operations (prompting for user input, scanning, decoding and validation) can be distributed between the client and one or more server computers.

The process of validating a product identifier with embedded security data can be extended in various ways. The embedded data and product identifier entered by the user may be used to form a key to decrypt data supplied in or by the product (e.g., software or multimedia content stored on a CD, DVD, etc.). In this case, the data supplied in or by the product is encrypted and the embedded data is used to convey one element of the key. Other elements of the key may be a product identifier, such as a serial number on the product, and a password of the user. Typically, the data supplied in the product is encrypted by the publisher when the product is made (e.g., burning of a CD, DVD, etc.). However, the encryption and security data embedding processes may be performed whenever data is transferred onto the product (e.g., transfer of data onto a writable storage device).

An additional enhancement is to use the cryptographic key formed from the embedded data and the user entered data (e.g., product identifier, password, etc.) to decrypt yet another key. This additional key can then be used to decrypt content supplied on or by the product. The product may be a storage device such as optical disk, magnetic storage device, flash memory, etc. that carries encrypted data, or some other type of device that supplies encrypted content.

Some examples of such devices are receivers of scrambled content like computers, set-top boxes, personal digital assistants, audio and video players, etc. Consider an example where a user wishes to watch a pay per view movie. The cable provider distributes promotional cards that enable the card holder to access the movie. To access the movie, which is provided in encrypted form via a set-top box or other cable receiver, the user displays the card to a camera connected to the set-top box through a wire or wireless connection. The set-top box decodes embedded security data on the card and combines it with other user and/or product information, such as the user's password, set-top box serial number, card number printed on the card, etc. to form a decryption key that is used to decrypt the movie, which streamed to the set-top box. A similar approach may be applied to other digital content that is downloaded or streamed in an encrypted form over a network, like the Internet, wireless phone network, cable television network, etc.

The security of the embedded data can be enhanced through the use of copy detection technology. Copy detection technology can be used to detect whether a counterfeiter has made a copy of the object bearing the embedded security data. For example, a counterfeiter might try to circumvent the authentication system by making a high quality copy of the image bearing the embedded security data using a scanner or copy machine, and then printing that image on a counterfeit product or its packaging.

The copy detection technology may be used to embed the security data (e.g., a watermark that is used to detect copying and convey security data) or may be separate from the security data (a separate watermark or other auxiliary data that is used to evince copying). One form of copy detection technology is a digital watermark that is altered in a predictable way when copied with a scanner, copy machine, or other imaging device. Such imaging devices apply a transformation to an image (e.g., an analog to digital sampling, color transformation, etc.) that can be detected by a watermark designed to change in a predictable way to such a transformation.

An example of copy detection technology is a "fragile" watermark. The watermark is called fragile because the strength of the watermark signal in a copy of the watermarked original object is less than the strength in the original object. To detect copying, the embedded data decoder attempts to detect the fragile watermark. If the fragile watermark is not present, or has a measured strength that falls below a threshold, then the decoder deems the object to be an invalid copy. There are a variety of ways to measure strength of a watermark signal. One way is to measure the extent of the correlation between an image of the suspect object and a reference fragile watermark signal.

Rather than using a separate fragile watermark, the authentication system may detect copying based on attributes of the watermark used to carry the embedded data. For example, the watermark may include a synchronization or orientation signal used to detect the presence of the watermark and determine its orientation. Copying of a watermarked object may be detected by measuring changes in the watermark orientation signal.

Since the watermark carrying the embedded data is made to survive distortion due to normal scanning operations required to read the watermark from an object, a fragile watermark may not accurately discern copying by a counterfeiter from these normal transformations. However, the watermark payload may be embedded in ways that survive these normal operations, yet still carries information from which copying can be discerned. For example, the payload of the watermark may be robustly encoded to withstand transformations due to scanning, geometric distortion, etc., yet convey information from which copying can be discerned.

One type of copy detection payload is an identifier that is related to some other characteristic of the object (another machine readable code, like a bar code, magnetic stripe, hologram, etc.).

Another form of copy detection is to scramble or encrypt part or all of the watermark payload in a predictable, yet different manner from one product to the next. This may be accomplished using a cryptographic hash that scrambles the payload using the product number or some other product specific attribute as a seed.

Another way is to scramble the location of the watermark or the relationship between different parts of the watermark using a cryptographic function. For example, the watermark may be replicated in blocks of an image, where each block encodes a similar payload, yet encodes that payload in a different manner based on a secret key. Each block may include an orientation signal that enables the decoder to properly align the image data for that block. In each block, the watermark payload may be scrambled differently, such as using a seed for a cryptographic scrambling function based on block location, block number, or data from the payload of another block, etc.

While the decoding process can use the orientation signal to align each block, it may not be able to discern the precise alignment of blocks in the scanned image relative to blocks in the original watermarked image. As such, the decoder may only be able to recover the relative location of blocks to each other, but not their absolute location in the original image. To address this challenge, the variation of the watermark or its payload across the image can be made in a relative manner from one block to the next using a secret key that defines the relationship between blocks. Relative changes between neighboring blocks enable the decoder to extract the payload from one block using information from one or more neighboring blocks. For example, the payload of one block may be altered using the payload of one or more adjacent blocks. The relationship between the payloads of adjacent blocks may be defined according to a cryptographic function. For example, the payload of one block may be used as a key to decoding an adjacent block.

A related enhancement is to use keys for decoding the watermark, the watermark payload, or digital content that are dependent on the host signal. This type of host signal dependent key makes it difficult to copy the embedded security data from one object to another. To illustrate this enhancement, consider embedded security data in an image watermark on a product, packaging, or label. One form of image dependent key is a key that is derived from a property of the image that is insensitive to the changes due to the watermark embedding process and recoverable in a watermark decoding operation on the embedded product.

An example of this type of key is a number that is derived from statistical properties of the image that are insensitive to the watermark embedding process, like the relative power differences between blocks of the image. The key could be, for instance, a binary number computed by comparing the power of a given block with a set of other blocks, such as those in a predetermined neighborhood around the given block. The comparison operations yield a one or zero depending on whether the power of the given block is greater or less than the selected neighbors. Each comparison operation yields a single bit in the key. The key may then be appended or combined with the watermark payload.

At the time of authentication, the watermark decoding process employs a synchronization or orientation signal to align the image data. Then it re-computes the image dependent key by repeating the key derivation operation as computed in the embedding process. The key computed at the time of decoding may be compared with the embedded key to check authenticity of the embedded data. Other properties that are insensitive to the watermark process may be used as well.

Another enhancement that can be used as a form of authentication and copy detection is to embed two or more different watermarks that have a known relationship with respect to each other. One such relationship is a predetermined offset in the spatial image domain, or some other transform domain, like a Discrete Fourier Transform, Discrete Cosine Transform, Discrete Wavelet Transform, or some re-sampling of one of these domains, like a log, log-log, or log-polar re-sampling. This known relationship changes in a predictable way when the watermarked object is copied. Thus, during the authentication process, a watermark decoding process detects the watermarks and computes this relationship between the watermarks. It then compares the computed relationship with the known relationship to determine whether some unauthorized transform likely occurred, such as copying.

The above sections refer to encryption and decryption operations. A variety of cryptographic technologies may be used to implement these operations. Some examples of encryption technologies include RSA, DES, IDEA (International Data Encryption Algorithm), skipjack, discrete log systems (e.g., El Gamal Cipher), elliptic curve systems, cellular automata, etc.

The above sections also refer to hash operations and in some cases, cryptographic hashes. Cryptographic hashes are functions used to convert a first number into a relatively unique second number in a manner that makes it difficult to derive the first number from the second number. Examples of hashing functions include MD5, MD2, SHA, SHA1.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method for authenticating a product comprising:
   receiving a product identifier associated with the product;
   decoding security data steganographically embedded into the product; and
   validating the product by comparing the decoded security data with the product identifier, and in response to validating the product, enabling use or transfer of software or content associated with the product.

2. The method of claim 1 wherein the security data is embedded in a digital watermark that is decoded from an image scanned of the product.

3. The method of claim 1 wherein the security data is decoded from a scan of product packaging for the product.

4. The method of claim 1 wherein the embedded security data comprises a hash of the product identifier.

5. A computer readable medium having software for performing the method of claim 1.

6. The method of claim 1 wherein the product comprises a physical storage medium and the software or content is stored on the physical storage medium.

7. A methods for authenticating a product comprising:
   receiving a product identifier associated with the product;
   decoding security data steganographically embedded into the product; and
   validating the product by comparing the decoded security data with the product identifier;
   wherein the product comprises software and including:
   controlling installation of software in response to validating the product.

8. A method for authenticating a product comprising:
   receiving a product identifier associated with the product;
   decoding security data steganographically embedded into the product; and
   validating the product by comparing the decoded security data with the product identifier;
   wherein the product comprises a financial or access card and including:
   controlling activation of the card in response to validating the product.

9. A method for authenticating a product comprising:
   receiving a product identifier associated with the product, including prompting a user to enter the product identifier;
   prompting the user to scan the product to capture a scan of the embedded security data;
   decoding security data steganographically embedded into the product; and
   validating the product by comparing the decoded security data with the product identifier.

10. A method for authenticating a product comprising:
    receiving a product identifier associated with the product;
    decoding security data steganographically embedded into the product; and
    validating the product by comparing the decoded security data with the product identifier; wherein a copy detection feature is printed on the product; and further including:
    using the copy detection feature to determine whether the product has been counterfeited.

11. The method of claim 10 wherein the copy detection feature comprises a watermark from which copying is detectable from analysis of a payload of the watermark.

12. A method for authenticating a product comprising:
    receiving a product identifier associated with the product;
    decoding security data steganographically embedded into the product; and
    validating the product by comparing the decoded security data with the product identifier;
    wherein a copy detection feature is included on the product; and the copy detection feature is used to determine whether the product has been counterfeited;
    wherein the copy detection feature comprises a watermark that changes when copied in a manner that enables copying of the product to be detected.

13. A product including:
    security data steganographically embedded into the product; the product being assigned a product identifier that is related to the security data such that authenticity of the product is evaluated by comparing the security data decoded from the product with the product identifier, wherein successful authentication of the product based on comparing the security data with the product identifier enables use or transfer of software or content associated with the product.

14. The method of claim 13 wherein the product comprises a physical storage medium and the software or content is stored on the physical storage medium.

15. A method of making a product comprising:
    assigning a product identifier to the product;
    steganographically embedding security data into the product, the security data including the product identifier; wherein the security data is machine readable and enables automated authentication of the product by comparing the security data decoded from the product with the product identifier; wherein successful authentication of the product based on comparing the security data with the product identifier enables use or transfer of software or content associated with the product.

16. The method of claim 15 wherein the product comprises a physical storage medium and the software or content is stored on the physical storage medium.

17. A method of authenticating a product comprising:

extracting embedded information steganographically encoded on a physical storage medium, the embedded information being carried in a code that is machine readable when exposed to visible, UV or infrared illumination; and using the embedded information to enable use or transfer of software or media content stored on the medium.

18. The method of claim 17 wherein the embedded information is carried in a watermark on the physical storage medium.

19. The method of claim 18 wherein the physical storage medium comprises an optical disk.

20. The method of claim 19 wherein the watermark is embedded on the disk by altering the surface microtopology on the disk to carry machine readable information.

21. The method of claim 17 wherein the embedded information is compared with information on the storage medium to enable use or transfer of software or media content stored on the medium.

22. The method of claim 21 wherein the embedded information is carried in a watermark on the physical storage medium.

23. The method of claim 22 wherein the watermark is embedded on the storage medium by altering the surface microtopology on the storage medium to carry machine readable information.

24. The method of claim 17 wherein the embedded information is used to form a key for decrypting software or media content stored on the medium.

25. The method of claim 24 wherein the embedded information is carried in a watermark on the physical storage medium.

26. The method of claim 25 wherein the watermark is embedded on the storage medium by altering the surface microtopology on the storage medium to carry machine readable information.

27. A product including:

security data steganographically embedded into the product; the product being assigned a product identifier that is related to the security data such that authenticity of the product is evaluated by comparing the security data decoded from the product with the product identifier; wherein the security data is carried in a digital watermark that is machine readable when illuminated by non-visible wavelengths; and wherein successful authentication of the product based on comparing the security data with the product identifier enables use or transfer of software or content associated with the product.

28. The product of claim 27 wherein the product comprises a physical storage medium and the software or content is stored on the physical storage medium.

29. The product of claim 28 wherein the security data is used to form a key for decrypting software or content stored on the storage medium.

* * * * *